(12) United States Patent
Zeng et al.

(10) Patent No.: US 11,775,598 B2
(45) Date of Patent: Oct. 3, 2023

(54) TRUSTWORTHY SEARCH METHOD FOR SEARCH ENGINE BASED ON KNOWLEDGE GRAPH

(71) Applicant: TONGJI UNIVERSITY, Shanghai (CN)

(72) Inventors: Guosun Zeng, Shanghai (CN); Chunling Ding, Shanghai (CN); Yingjie Xie, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 176 days.

(21) Appl. No.: 17/376,097

(22) Filed: Jul. 14, 2021

(65) Prior Publication Data
US 2022/0147581 A1    May 12, 2022

(30) Foreign Application Priority Data
Nov. 12, 2020    (CN) .......................... 202011263730.2

(51) Int. Cl.
*G06F 16/30*    (2019.01)
*G06F 16/953*    (2019.01)
(Continued)

(52) U.S. Cl.
CPC ............ *G06F 16/953* (2019.01); *G06F 17/18* (2013.01); *G06N 5/025* (2013.01)

(58) Field of Classification Search
CPC ........ G06F 16/953; G06F 17/18; G06N 5/025
See application file for complete search history.

(56) References Cited

U.S. PATENT DOCUMENTS 6,490,579 B1 *   12/2002   Gao ...................... G06F 16/951
                                                                          707/999.005
6,564,213 B1 *   5/2003   Ortega ................ G06F 16/3322
                                                                          707/999.005
(Continued)

FOREIGN PATENT DOCUMENTS

CN        102103598 A  *   6/2011
CN        103646034           3/2014
(Continued)

OTHER PUBLICATIONS

Zhongqun Wang et al., "Credibility Ranking Model for Online Product Reviews Based on Knowledge Graph", Information studies: Theroy & Application, vol. 43, No. 8, with English abstract, Aug. 30, 2020, pp. 134-139.
(Continued)

*Primary Examiner* — Mahesh H Dwivedi
(74) *Attorney, Agent, or Firm* — JCIP GLOBAL INC.

(57) ABSTRACT

The present invention relates to a trustworthy search method for a search engine based on a knowledge graph, which includes: acquiring a search keyword input by a user to construct a keyword pool; selecting a keyword according to a keyword selection policy, and respectively inputting the keyword to a search engine in sequence for searching to obtain a result returned by the search engine; constructing a knowledge graph of a Web page in sequence; selecting a specific knowledge mode; matching the knowledge graph with an existing semantics reliable knowledge graph library, and then computing a content support degree of each Web page according to a matching result; sorting the search engine under the same keyword by using a content support degree expectation of the Web page; and completing trustworthy search of the search engine based on the knowledge graph.

10 Claims, 3 Drawing Sheets

(51) Int. Cl.
*G06F 17/18* (2006.01)
*G06N 5/025* (2023.01)

(56) References Cited

U.S. PATENT DOCUMENTS

| | | | | |
|---|---|---|---|---|
| 2012/0130814 A1* | 5/2012 | Hayes | ............ | G06F 16/951 |
| | | | | 705/14.54 |
| 2012/0296918 A1* | 11/2012 | Morris | ............ | G06F 16/9535 |
| | | | | 707/E17.084 |
| 2016/0277424 A1* | 9/2016 | Mawji | ............ | H04L 63/1408 |
| 2016/0294846 A1* | 10/2016 | Sharov | ............ | G06F 16/24578 |
| 2017/0177576 A1* | 6/2017 | Cohen | ............ | G06F 16/248 |
| 2017/0235792 A1* | 8/2017 | Mawji | ............ | G06F 16/29 |
| | | | | 707/769 |

FOREIGN PATENT DOCUMENTS

| | | | |
|---|---|---|---|
| CN | 111191042 | | 5/2020 |
| CN | 111368092 | | 7/2020 |
| CN | 113312537 A | * | 8/2021 |
| WO | 2014089776 | | 6/2014 |

OTHER PUBLICATIONS

"Office Action of China Counterpart Application", dated Jul. 4, 2022, p. 1-p. 5.

* cited by examiner

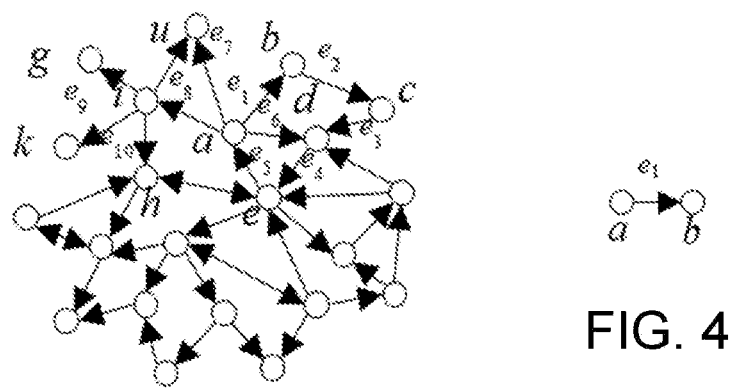
FIG. 3
FIG. 4
FIG. 5
FIG. 6
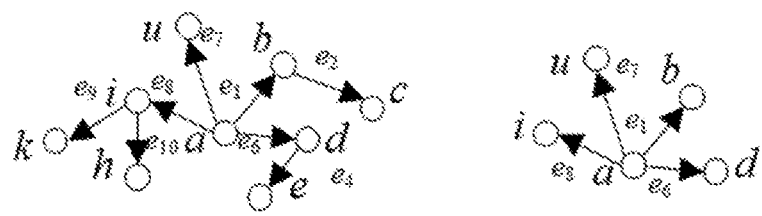
FIG. 7
FIG. 8

# TRUSTWORTHY SEARCH METHOD FOR SEARCH ENGINE BASED ON KNOWLEDGE GRAPH

CROSS-REFERENCE TO RELATED APPLICATION

This application claims the priority benefit of China application serial no. 202011263730.2 filed on Nov. 12, 2020. The entirety of the above-mentioned patent application is hereby incorporated by reference herein and made a part of this specification.

BACKGROUND

Technical Field

The present invention relates to search methods, and in particular, to a trustworthy search method for a search engine based on a knowledge graph.

Description of Related Art

At present, users have multiple choices to use network search engines. The search result typically returned by a good search engine has the high information quality and strong trustworthiness. The result typically obtained with a poor search engine, however, has the low quality and poor authenticity. Hence, there is a need to make a trustworthy search evaluation on the search engine, thereby helping the users to reasonably select the search engine. Numerous related jobs on trustworthy research of search engines have been conducted in home and abroad. Researches are mainly developed around such levels as Web site, transmission link, internal and external links, content and structure reliability, search relevance, user click rate and user feedback of the Web pages. The present invention focuses on the content trustworthiness of the Web page that is returned by the search engine, and provides a trustworthy search method for the search engine based on a knowledge graph.

The existing researches on the content trustworthiness are mainly as follows. (1) The content trustworthiness is simply and vaguely computed by the number of internal and external links of the Web page, the relevance with search keywords, the user click-through rate and the like. However, such a research lacks measures for authenticity and reliability on the content of the Web page, and completely depends on and gives considerations to external factors. (2) The subjects in the content of the Web page are extracted and analyzed in methods such as clustering and neural networks, and it is considered that the more concentrated the subjects, the higher the relevance and the stronger the reliability of the content. However, this research only makes analysis on the subjects of the content, and lacks measures on the trustworthiness of entities, relations and the like in the content. (3) The relevance reliability between different entities in the Web page is analyzed by natural language processing technologies and semantic inference technologies. Although taking the trustworthiness of the entities and relations into account, the research lacks a relatively thorough and comprehensive trustworthy evaluation process. To sum up, these methods do not make a substantive and more thorough evaluation on the content trustworthiness after all though computing the content trustworthiness from certain levels.

SUMMARY

An objective of the present invention is to provide a high-reliability trustworthy search method for a search engine based on a knowledge graph, to overcome the defects of the prior art.

The objective of the present invention may be implemented via the following solutions:

A trustworthy search method for a search engine based on a knowledge graph includes the following steps:
- step 1: acquiring a search keyword input by a user to construct a keyword pool;
- step 2: selecting n keywords according to a keyword selection policy $S_Q$, and respectively inputting the keywords to m search engines in sequence for searching to obtain results returned by the search engines;
- step 3: selecting k returned results from a returned search Web page set according to a search result selection policy $S_R$;
- step 4: constructing a knowledge graph of a Web page in sequence for the k returned results selected in step 3;
- step 5: selecting a specific knowledge mode;
- step 6: matching the knowledge graph obtained according to step 4 with an existing semantics reliable knowledge graph library, and then computing a content support degree of each Web page according to a matching result;
- step 7: sorting the m search engines under the same keyword by using content support degree expectations of k Web pages, and integrating Web page content support degree conditions of the n keywords to obtain a final trustworthy search sorting result of the search engine; and
- step 8: completing trustworthy search of the search engine based on the knowledge graph.

Preferably, the keyword selection policy $S_Q$ is specifically as follows:

respectively counting, for any keyword $q_i \in Q$ input by the user, a field $d_j \in D$ and a type $c_k \in C$ to which the keyword belongs to obtain a field set $D=\{d_1, d_2, \ldots, d_{|D|}\}$ and a type set $C=\{c_1, c_2, \ldots, c_{|C|}\}$ of all keywords, and separating all keywords into $$\sum_{j=1}^{|D|}\sum_{k=1}^{|C|} Q_{jk} = |D| \times |C|$$

blocks according to fields and types, wherein a block $Q_{jk}$ includes $n_{jk}$ keywords, the keywords all having a field of $d_j$ and a type of $c_k$, $$\sum_{j=1}^{|D|}\sum_{k=1}^{|C|} n_{jk} = |Q|;$$

and randomly selecting, for each block $Q_{jk}$, one keyword therefrom at a probability $$p_{jk} = \frac{1}{n_{jk}}$$

for subsequent operation.

Preferably, the search result selection policy $S_R$ is specifically as follows:

equally separating the returned search Web page set R into m blocks, m=|R|, R=$R_1 \cup R_2 \cup \ldots \cup R_m$ and $$|R_i| \approx \frac{|R|}{m},$$

and respectively selecting TOP $$k_i = \text{round}\left(\frac{m+1-i}{\sum_{j=1}^{m} j} \times k\right)$$

Web pages in a block $R_i$ for subsequent operation, i∈ {1, 2, ..., m}, $$\sum_{i=1}^{m} k_i = k.$$

Preferably, step 4 is specifically as follows:

converting a Web page corresponding to each returned search result into a unique knowledge graph WG=($V_w$, $E_w$) after performing filtration and content analysis and extraction on the Web page; and constructing the knowledge graph as a directed graph by following a construction rule of an existing knowledge graph KG=($V_k$, $E_k$), node types $v_e$, $v_c$ and $v_v$ in the knowledge graph respectively representing an entity, a type and a value in the Web page, directed edges $e_p$ and $e_r$ in the knowledge graph respectively representing a property and a relation in the Web page, and a triple formed by node-directed edge-node, that is, (v,e,v), representing knowledge contained in the Web page.

Preferably, the knowledge mode in step 5 includes: a fact, a trust chain and a trust domain;

the fact in the knowledge mode is specifically a triple formed by node-directed edge-node, that is, (v,e,v) and corresponds to one edge of the knowledge graph WG=($V_w$, $E_w$);

the trust chain in the knowledge mode is specifically a path ($v_1$, $e_{<1, 2>}$, $v_2$, $e_{<2, 3>}$, $v_3$, L, $v_{n-1}$, $e_{<n-1, n>}$, $v_n$) in form, and corresponds to a reachable path in the knowledge graph WG=($V_w$, $E_w$); and the trust domain in the knowledge mode is specifically a trustworthy region, and corresponds to a spanning tree in the knowledge graph WG=($V_w$, $E_w$).

Preferably, step 6 is specifically as follows:

computing a content support degree of a Web page according to the knowledge mode selected in step 5; computing a support degree $\theta_0$ of each fact with a fact support computing sub-method OFSD( ) if a fact knowledge mode is selected; computing a support degree of a trust chain with a trust chain support computing sub-method TCD( ) if a trust chain knowledge mode is selected; and computing a support degree of a trust domain with a trust domain support computing sub-method TBD( ) if a trust domain knowledge mode is selected.

More preferably, the fact support computing sub-method OFSD( ) specifically as follows:

first determining support degrees $\theta_0$ of all single facts in the knowledge graph WG, and then computing a mean support degree of all single facts to serve as a final fact support degree.

More preferably, the trust chain support computing sub-method TCD( ) specifically as follows:

modifying the support degree of the fact when computing the support degree of the trust chain, the modified support degree of the fact being as follows:

$$\theta'_0 = \theta_0^{1-\rho_1 \times \frac{s}{t_1}}$$

where, $t_1$ is the number of facts included in the trust chain, s is the number of reliable facts propagated continuously at present, and $\rho_1 \in [0, 1]$ is a first modifying excitation factor; and computing the support degree of the trust chain through the mean after computing the support degree of each fact in the trust chain.

More preferably, the trust domain support computing sub-method TBD( ) is specifically as follows:

modifying the support degree of the fact when computing the support degree of the trust domain, the modified support degree of the fact being as follows:

$$\theta''_0 = \theta_0^{1-\rho_2 \times \frac{s_{kl}}{t_2}}$$

where, $\rho_2 \in [0, 1]$ is a second modifying excitation factor, $s_{kl}$ is the number of reliable facts continuously propagated in a path from a root node to a present node in the spanning tree, and $t_2$ is the number of edges included in the spanning tree.

More preferably, step 7 is specifically as follows:

computing support degree expectations of the k Web pages, sorting the m search engines according to the support degree expectations, and then integrating sorting results of the search engines under the n keywords to obtain final trustworthy sorting of the search engines.

Compared with the prior art, the present invention has the following advantages:

The reliability is high. The trustworthy search method for the search engine in the present invention converts the Web page into the knowledge graph, offers the content support degree computing method of the Web page in each knowledge mode by analyzing and designing the trustworthy knowledge modes, and then innovatively helps the search engine to perform content trustworthy search; and the trustworthy search method respectively designs the content support degree algorithm of the Web page in different knowledge modes by using a concept that "a small graph is matched with a large graph", takes the computed matching support as an important basis for sorting, and finally selects a plurality of search keywords and a plurality of returned search results to perform trustworthy sorting on the search engine according to the content trustworthiness of the Web page, thereby greatly improving the reliability and accuracy of sorting.

BRIEF DESCRIPTION OF THE DRAWINGS

FIG. 3 is a schematic diagram of a knowledge graph in an embodiment of the present invention.

FIG. 4 is a schematic diagram of a fact in an embodiment of the present invention.

FIG. 5 is a schematic diagram of a trust chain in an embodiment of the present invention.

FIG. 6 is a schematic diagram of a trust circle in an embodiment of the present invention.

FIG. 7 is a schematic diagram of a first trust domain in an embodiment of the present invention.

FIG. 8 is a schematic diagram of a second trust domain in an embodiment of the present invention.

DESCRIPTION OF THE EMBODIMENTS

The technical solutions in the embodiments of the present invention will be clearly and completely described hereinafter with the drawings in the embodiments of the present invention. It is apparent that the described embodiments are only part of the embodiments of the present invention, not all of the embodiments. All other embodiments obtained by those of ordinary skill in the art based on the embodiments of the present invention without creative efforts shall pertain to the scope of protection of the present invention.

Figure 1:
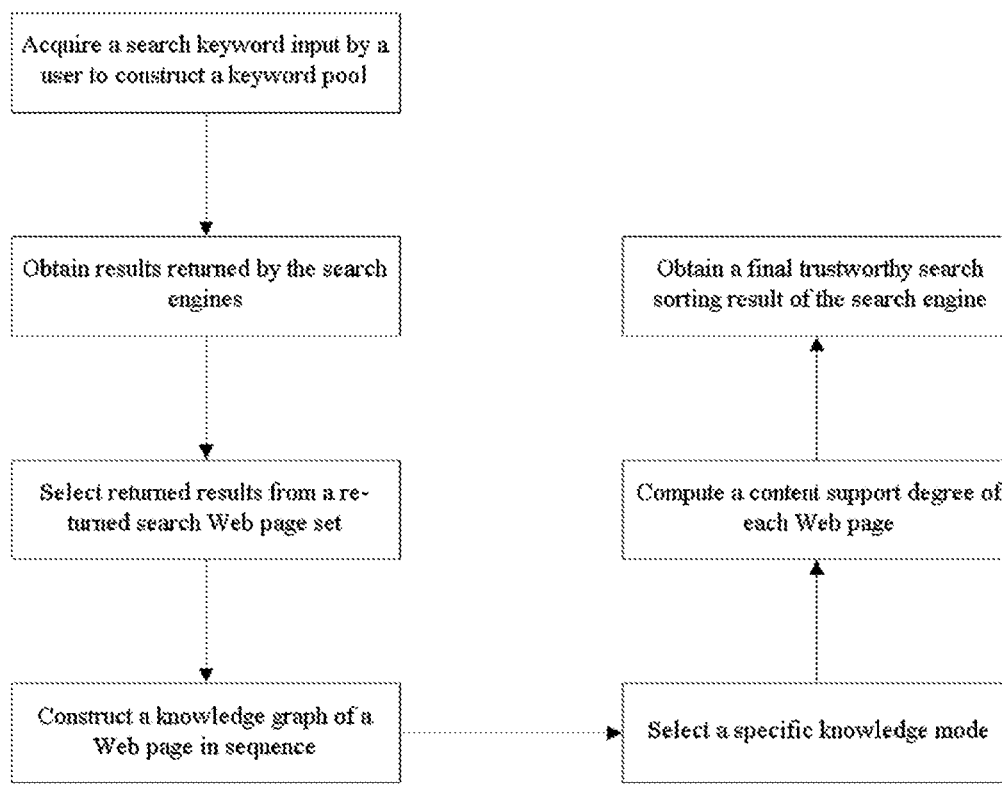
FIG. 1 is a flowchart schematic diagram of a trustworthy search method for a search engine in the present invention.
Figure 2:
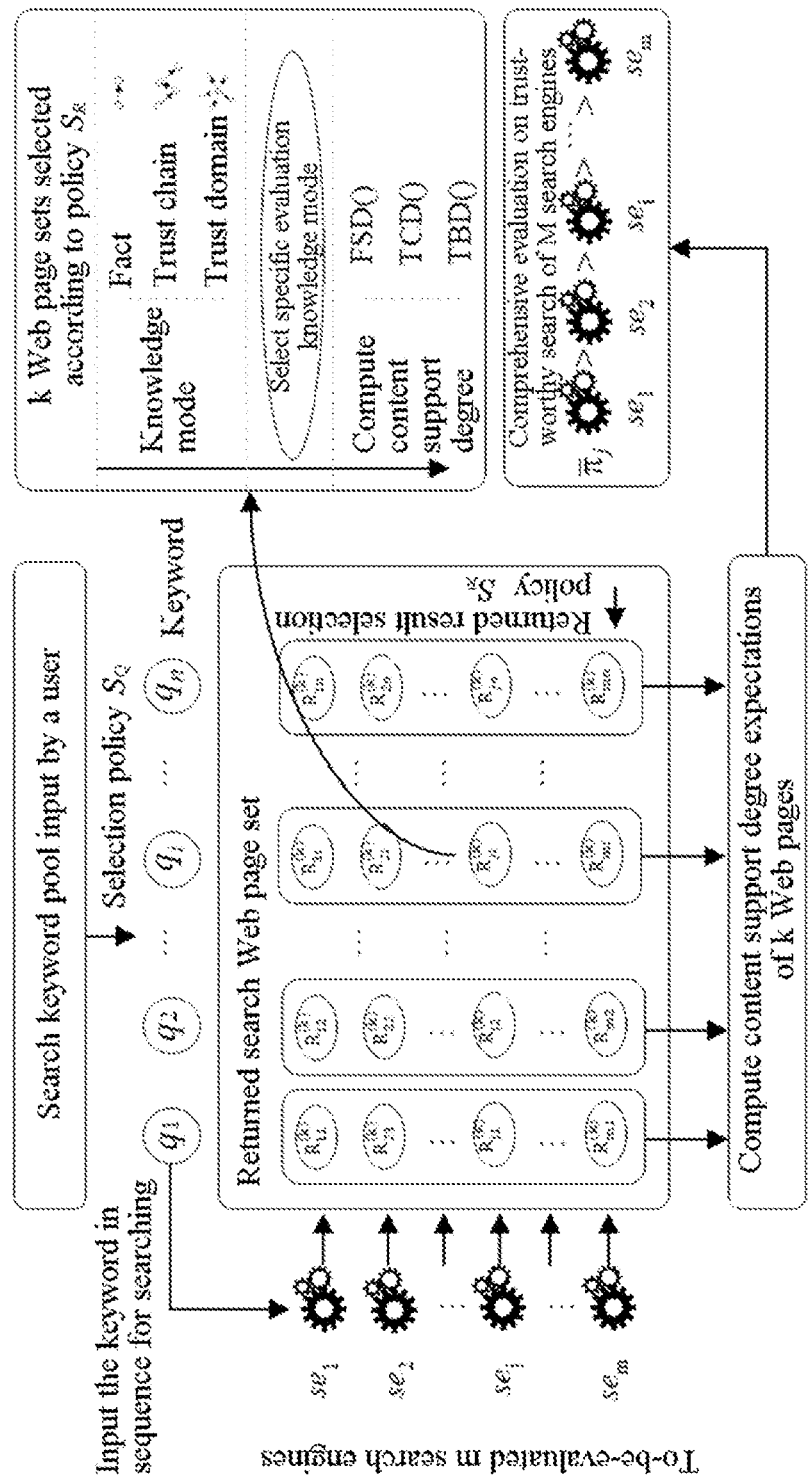
FIG. 2 is a process schematic diagram of a trustworthy search method for a search engine in an embodiment of the present invention.

A trustworthy search method for a search engine based on a knowledge graph has a process as shown in FIG. 1 and FIG. 2, and includes the following steps:

Step 1: a search keyword input by a user is acquired to construct a keyword pool.

Step 2: n keywords are selected according to a keyword selection policy $S_Q$, and respectively input to m search engines in sequence for searching to obtain results returned by the search engines.

Step 3: k returned results are selected from a returned search Web page set according to a search result selection policy $S_R$.

As the user may input any content and form of keyword as required, and the search engine has keyword search sensitivity, arbitrarily or randomly selecting the keyword may be unfair to evaluate the trustworthy search of the search engine. Hence, the randomness for selecting the keyword should be eliminated as much as possible, and the keyword selection should be ensured to have the representativeness. The embodiment offers the keyword selection policy $S_Q$ in combination with the block selection concept from the field and type to which the keyword belongs. With regard to the returned search Web page set, the common evaluation and selection policy is to select and use TOP k Web pages therein to evaluate and analyze the search engine. By taking the TOP k selection concept into account, and considering from the returned search Web set overall, the embodiment offers a hierarchical selection policy $S_R$ of selecting k Web pages $R^{(k)}$ from the returned result set R to evaluate the trustworthy search.

In the embodiment, the keyword selection policy $S_Q$ is specifically as follows:

For any keyword $q_i \in Q$ input by the user, a field $d_j \in D$ and a type $c_k \in C$ to which the keyword belongs are respectively counted to obtain a field set $D=\{d_1, d_2, \ldots, d_{|D|}\}$ and a type set $C=\{c_1, c_2, \ldots, c_{|C|}\}$ of all keywords, and all keywords are separated into $$\sum_{j=1}^{|D|}\sum_{k=1}^{|C|} Q_{jk} = |D| \times |C|$$

blocks according to fields and types, wherein a block $Q_{jk}$ includes $n_{jk}$ keywords, the keywords all having a field of $d_j$ and a type of $c_k$, $$\sum_{j=1}^{|D|}\sum_{k=1}^{|C|} n_{jk} = |Q|;$$

and for each block $Q_{jk}$, one keyword is randomly selected therefrom at a probability $$p_{jk} = \frac{1}{n_{jk}}$$

for subsequent operation.

In the embodiment, the search result selection policy $S_R$ is specifically as follows:

The returned search Web page set R is equally separated into m blocks, m=|R|, $R = R_1 \cup R_2 \cup \ldots \cup R_m$ and $$|R_i| \approx \frac{|R|}{m},$$

and TOP $$k_i = \text{round}\left(\frac{m+1-i}{\sum_{j=1}^{m} j} \times k\right)$$

Web pages in a block $R_i$ are respectively selected for subsequent operation, $i \in \{1, 2, \ldots, m\}$, $$\sum_{i=1}^{m} k_i = k,$$

and a function round representing a rounding-off counting process.

Step 4: a knowledge graph, that is, a "small graph", of a Web page is constructed in sequence for the k returned results selected in step 3, specifically:

Each returned search result corresponds to one Web page, after filtration and content analysis and extraction are performed on the Web page, the Web page is converted into a unique knowledge graph $WG=(V_w, E_w)$ and the knowledge graph is constructed as a directed graph by following a construction rule of an existing knowledge graph $KG=(V_k, E_k)$, node types $v_e$, $v_c$ and $v_v$ in the knowledge graph respectively representing an entity, a type and a value in the Web page, directed edges $e_p$ and $e_r$ in the knowledge graph respectively representing a property and a relation in the Web page, and a triple formed by node-directed edge-node, that is, (v,e,v) representing knowledge contained in the Web page.

Step 5: a specific knowledge mode is selected, the knowledge mode including: a fact, a trust chain and a trust domain.

Information contents for a great number of Web pages are character strings described by a natural language. One integral declarative sentence is an objective statement on the matter or object, and a plurality of declarative sentences reflect the semantics and subjects of the content through fact correlation. In order to analyze the semantics on the content trustworthiness of the Web page, the embodiment designs three trustworthy knowledge modes, namely, a fact, a trust chain and a trust domain.

The fact in the knowledge mode is specifically a triple formed by node-directed edge-node, that is, (v,e,v), and corresponds to one edge of the knowledge graph WG=($V_w$, $E_w$).

The trust chain in the knowledge mode is specifically a path ($v_1$, $e_{<1,\ 2>}$, $v_2$, $e_{<2,\ 3>}$, $v_3$, L, $v_{n-1}$, $e_{<n-1,\ n>}$, $v_n$) in form, and corresponds to a reachable path in the knowledge graph WG=($V_w$, $E_w$).

The trust domain in the knowledge mode is specifically a trustworthy region, and corresponds to a spanning tree in the knowledge graph WG=($V_w$, $E_w$).

The knowledge graph and three knowledge modes are as shown in FIGS. 3-8. There are a plurality of trust chains and a plurality of trust domains in the knowledge graph. In the embodiment, the unique diameter of the knowledge graph is used as the trust chain, and the minimum spanning tree is selected as the trust domain.

Step 6: the knowledge graph obtained according to Step 4 is matched with an existing semantics reliable knowledge graph library that is called as a "large graph", and then a content support degree of each Web page is computed according to a matching result, specifically:

The content support degree of the Web page is computed, by using a concept that "the small graph is matched with the large graph", according to the knowledge mode selected in Step 5; a support degree $\theta_0$ of each fact is computed with a fact support computing sub-method OFSD( ) if a fact knowledge mode is selected; a support degree of a trust chain is computed with a trust chain support computing sub-method TCD( ) if a trust chain knowledge mode is selected; and a support degree of a trust domain is computed with a trust domain support computing sub-method TBD( ) if a trust domain knowledge mode is selected.

The fact support computing sub-method OFSD( ) specifically as follows:

When the fact support computation is performed, support degrees $\theta_0$ of all single facts in the knowledge graph WG are first determined, and then a mean support degree of all single facts is computed to serve as a final fact support degree.

The trust chain support computing sub-method TCD( ) is specifically as follows:

The support degree of the fact is modified when the support degree of the trust chain is computed, the modified support degree of the fact being as follows:

$$\theta'_0 = \theta_0^{1-\rho_1 \times \frac{s}{t_1}}$$

Where, $t_1$ is the number of facts included in the trust chain, s is the number of reliable facts propagated continuously at present, and $\rho_1 \in [0, 1]$ is a first modifying excitation factor.

The support degree of the trust chain is computed through the mean after the support degree of each fact in the trust chain is computed.

The trust domain support computing sub-method TBD( ) specifically as follows:

The support degree of the fact is modified when the support degree of the trust domain is computed, the modified support degree of the fact being as follows:

$$\theta''_0 = \theta_0^{1-\rho_2 \times \frac{s_{kl}}{t_2}}$$

Where, $\rho_2 \in [0, 1]$ is a second modifying excitation factor, $s_{kl}$ is the number of reliable facts continuously propagated in a path from a root node to a present node in the spanning tree, and $t_2$ is the number of edges included in the spanning tree.

Step 7: the m search engines under the same keyword are sorted by using the content support degree expectations of k Web pages, and Web page content support degree conditions of the n keywords are integrated to obtain a final trustworthy search sorting result of the search engine, specifically:

Support degree expectations of the k Web pages are computed, the m search engines are sorted according to the support degree expectations, and then sorting results of the search engines under the n keywords are integrated to obtain final trustworthy sorting of the search engines.

Step 8: trustworthy search of the search engine based on the knowledge graph is completed.

In the embodiment, the whole process includes the following specific implementation steps:

Input: a group of to-be-evaluated search engines SE={$se_1$, $se_2$, . . . , $se_m$}, a group of search keywords Q={q1, q2, . . . , $q_n$}, knowledge graph library KG=($V_k$, $E_k$), and a group of preset constant parameters {$\rho$, k}.

Output: trustworthy search sorting set for the to-be-evaluated search engines.

(1) Keyword and returned search result selection policies $S_Q$ and $S_R$ are formulated.

(2) The keyword $q_i$ is input to the search engine $se_j$ in sequence for searching to obtain a great number of Web page returned results, and the Web page set $R_{ji}^{(k)}$ is respectively selected according to the policy $S_R$.

(3) Any Web page $r_x \in R_{ji}^{(k)}$ is filtered and converted into a knowledge graph $WG_x$.

(4) According to the selected knowledge mode and corresponding support algorithm, the support degree of $r_x \in R_{ji}^{(k)}$ is computed as $\theta_{ji}^{(x)}$.

(5) Support degree expectations $$\theta_E = \frac{1}{k} \times \sum_{x=1}^{k} \theta_{ji}^{(x)}$$

of k Web pages are computed, and trustworthy search evaluation sorting $\overline{\pi}_{ji}$ is performed on m search engines according to the support degree expectations.

(6) Sorting values $\overline{\pi}_{ji}$ of the search engines under n keywords are integrated, and the final trustworthy search sorting of the search engine $se_j$ is given:

$$\pi_{jE} = \frac{1}{n} \times \sum_{i=1}^{n} \overline{\pi}_{ji}.$$

(7) The trustworthy search sorting set of the to-be-evaluated search engine is returned according to $\pi_{jE}$.

The above are only the specific implementation manners of the present invention and not intended to limit the scope of protection of the present invention. Any variations or replacements readily conceivable to those skilled in the art within the technical scope disclosed by the present invention shall fall within the scope of protection of the present invention. Therefore, the scope of protection of the present invention shall be subject to the scope of protection of the claims.

What is claimed is:

1. A trustworthy search method for a search engine based on a knowledge graph, the trustworthy search method comprising the following steps:
- step 1: acquiring a search keyword input by a user to construct a keyword pool;
- step 2: selecting n keywords according to a keyword selection policy $S_Q$, and respectively inputting the keywords to m search engines in sequence for searching to obtain results returned by the search engines; wherein m is greater than or equal to 1, and n is greater than or equal to 1;
- step 3: selecting k returned results from a returned search Web page set according to a search result selection policy $S_R$; wherein k is greater than or equal to 1;
- step 4: constructing a knowledge graph of a Web page in sequence for the k returned results selected in the step 3;
- step 5: selecting a specific knowledge mode;
- step 6: matching the knowledge graph obtained according to the step 4 with an existing semantics reliable knowledge graph library, and then computing a content support degree of each Web page according to a matching result;
- step 7: sorting the m search engines under the same keyword by using content support degree expectations of k Web pages, and integrating Web page content support degree conditions of the n keywords to obtain a final trustworthy search sorting result of the search engine; and
- step 8: completing trustworthy search of the search engine based on the knowledge graph.

2. The trustworthy search method for the search engine based on the knowledge graph according to claim 1, wherein the keyword selection policy $S_Q$ is specifically as follows:
respectively counting, for any keyword $q_i \in Q$ input by the user, a field $d_j \in D$ and a type $c_k \in C$ to which the keyword belongs to obtain a field set $D=\{d_1, d_2, \ldots, d_{|D|}\}$ and a type set $C=\{c_1, c_2, \ldots c_{|C|}\}$ of all keywords, and separating all keywords into $$\sum_{j=1}^{|D|}\sum_{k=1}^{|C|} Q_{jk} = |D| \times |C|$$

blocks according to fields and types, wherein a block $Q_{jk}$ comprises $n_{jk}$ keywords, the keywords all having a field of $d_j$ and a type of $c_k$, $$\sum_{j=1}^{|D|}\sum_{k=1}^{|C|} n_{jk} = |Q|;$$

and randomly selecting, for each block $Q_{jk}$, one keyword therefrom at a probability $$p_{jk} = \frac{1}{n_{jk}}$$

for subsequent operation.

3. The trustworthy search method for the search engine based on the knowledge graph according to claim 1, wherein the search result selection policy $S_R$ is specifically as follows:
equally separating the returned search Web page set R into m blocks, m=|R|, $R=R_1 \cup R_2 \cup \ldots \cup R_m$ and $$|R_i| \approx \frac{|R|}{m},$$

and respectively selecting TOP $$k_i = \text{round}\left(\frac{m+1-i}{\sum_{j=1}^{m} j} \times k\right)$$

Web pages in a block $R_i$ for subsequent operation, $i \in \{1, 2, \ldots, m\}$ $$\sum_{i=1}^{m} k_i = k.$$

4. The trustworthy search method for the search engine based on the knowledge graph according to claim 1, wherein the step 4 is specifically as follows:
converting, a Web page corresponding to each returned search result into a unique knowledge graph $WG=(V_w, E_w)$ after performing filtration and content analysis and extraction on the Web page; and constructing the knowledge graph as a directed graph by following a construction rule of an existing knowledge graph $KG=(V_k, E_k)$, node types $v_e$, $v_c$ and $v_v$ in the knowledge graph respectively representing an entity, a type and a value in the Web page, directed edges p and r in the knowledge graph respectively representing a property and a relation in the Web page, and a triple formed by node-directed edge-node, that is, (v,e,v), representing knowledge contained in the by node-directed edge-node, that is, Web page.

5. The trustworthy search method for the search engine based on the knowledge graph according to claim 1, wherein the knowledge mode in the step 5 comprises: a fact, a trust chain and a trust domain;
the fact in the knowledge mode is specifically a triple formed by node-directed edge-node, that is, (v,e,v), and corresponds to one edge of the knowledge graph $WG=(V_w,E_w)$;
the trust chain in the knowledge mode is specifically a path $(v_1, e_{<1,2>}, v_2, e_{<2,3>}, v_3, L, v_{n-1} e_{<n-1,n>}, v_n)$ in form, and corresponds to a reachable path in the knowledge graph $WG=(V_w,E_w)$; and
the trust domain in the knowledge mode is specifically a trustworthy region, and corresponds to a spanning tree in the knowledge graph $WG=(V_w,E_w)$.

6. The trustworthy search method for the search engine based on the knowledge graph according to claim 5, wherein the step 6 is specifically as follows:
computing a content support degree of the Web page according to the knowledge mode selected in the step 5; computing a support $\theta_0$ of each fact with a fact support computing sub-method OFSD( ) if a fact knowledge mode is selected; computing a support degree of a trust chain with a trust chain support computing sub-method TCD( ) if a trust chain knowledge mode is selected; and computing a support degree of a trust domain with a trust domain support computing sub-method TBD( ) if a trust domain knowledge mode is selected.

7. The trustworthy search method for the search engine based on the knowledge graph according to claim 6, wherein the fact support computing sub-method OFSD( ) is specifically as follows:

first determining support degrees $\theta_0$ of all single facts in the knowledge graph WG, and then computing a mean support degree of all single facts to serve as a final fact support degree.

8. The trustworthy search method for the search engine based on the knowledge graph according to claim 7, wherein the trust chain support computing sub-method TCD( ) is specifically as follows:

modifying the support degree of the fact when computing the support degree of the trust chain, the modified support degree of the fact being as follows:

$$\theta'_0 = \theta_0^{1-\rho_1 \times \frac{s}{t_1}}$$

where, $t_1$ is the number of facts comprised in the trust chain, s is the number of reliable facts propagated continuously at present, and $\rho_1 \in [0,1]$ is a first modifying excitation factor; and computing the support degree of the trust chain through the mean after computing the support degree of each fact in the trust chain.

9. The trustworthy search method for the search engine based on the knowledge graph according to claim 8, wherein the trust domain support computing sub-method TBD( ) is specifically as follows:

modifying the support degree of the fact when computing the support degree of the trust domain, the modified support degree of the fact being as follows:

$$\theta''_0 = \theta_0^{1-\rho_2 \times \frac{s_{kl}}{t_2}}$$

where, $\beta_2 \in [0,1]$ is a second modifying excitation factor, $s_{kl}$ is the number of reliable facts continuously propagated in a path from a root node to a present node in the spanning tree, and $t_2$ is the number of edges comprised in the spanning tree.

10. The trustworthy search method for the search engine based on the knowledge graph according to claim 8, wherein the step 7 is specifically as follows:

computing support degree expectations of the k Web pages, sorting the m search engines according to the support degree expectations, and then integrating sorting results of the search engines under the n keywords to obtain a final trustworthy sorting of the search engines.

* * * * *